(12) United States Patent
Sturgulewski

(10) Patent No.: US 10,625,231 B2
(45) Date of Patent: Apr. 21, 2020

(54) RETENTION AND ANGLE ADJUSTMENT OF A VIBRATING CALCINER VESSEL

(71) Applicant: Raymond Matthew Sturgulewski, Pittsburgh, PA (US)

(72) Inventor: Raymond Matthew Sturgulewski, Pittsburgh, PA (US)

( * ) Notice: Subject to any disclaimer, the term of this patent is extended or adjusted under 35 U.S.C. 154(b) by 0 days.

(21) Appl. No.: 15/929,117

(22) Filed: Mar. 26, 2019

(65) Prior Publication Data

US 2019/0329204 A1    Oct. 31, 2019

Related U.S. Application Data

(60) Provisional application No. 62/762,142, filed on Apr. 23, 2018.

(51) Int. Cl.
*B01J 6/00* (2006.01)
*F27B 17/00* (2006.01)

(52) U.S. Cl.
CPC .............. *B01J 6/001* (2013.01); *F27B 17/00* (2013.01)

(58) Field of Classification Search
CPC ................................. B01J 6/001; F27B 17/00
USPC .......................................................... 432/11
See application file for complete search history.

(56) References Cited

U.S. PATENT DOCUMENTS

| 2,019,912 | A | * | 11/1935 | Sachs | F27B 17/00 432/14 |
| 3,661,409 | A | | 5/1972 | Brown et al. | |
| 3,827,159 | A | * | 8/1974 | Venanzetti | B07B 1/12 34/164 |
| 4,728,203 | A | * | 3/1988 | Okamoto | F27B 7/22 384/549 |
| 5,201,501 | A | | 4/1993 | Fassler | |
| 5,513,838 | A | | 5/1996 | Rossum | |

FOREIGN PATENT DOCUMENTS

WO    WO 2017/137831 A1 *    8/2017

* cited by examiner

*Primary Examiner* — Grant Moubry
*Assistant Examiner* — Benjamin W Johnson
(74) *Attorney, Agent, or Firm* — Kintner IP, LLC; Mary Frances Ludwig

(57) ABSTRACT

A vibrating calciner includes circular ring segments surrounding a vessel and clamps adjustable to apply pressure to the ring segments. A plurality of vessel dams are positioned within the vessel and spaced apart along a central longitudinal axis. The vessel is rotatably positionable about the central longitudinal axis within the circular ring segments such that inner edges of the of vessel dams may be positioned at an angle substantially equal to the dynamic angle of repose of a granular material. The vessel is held in position by the clamps which contact the ring segments. In embodiments, the vessel may be rotated to drain material through a drain tube positioned opposite the vessel dams.

9 Claims, 4 Drawing Sheets

RETENTION AND ANGLE ADJUSTMENT OF A VIBRATING CALCINER VESSEL

CROSS REFERENCE TO RELATED APPLICATION

This application claims the benefit of U.S. Provisional Patent Application Ser. No. 62/762,142, filed on Apr. 23, 2018, which is hereby incorporated in its entirety.

TECHNICAL FIELD

This invention provides a method of supporting the vessel of a vibrating calciner which allows adjusting the angle of the vessel so it may align with the angle of dynamic repose of granular material and also provides a method of draining the vessel of granular material. The method comprises an arrangement of opposed clamps held in position by compression springs.

BACKGROUND OF THE INVENTION

Clamping circular objects with a pair of opposing jaws is known in the art, for example in U.S. Pat. No. 5,201,501 to Fassler. However Fassler relies upon a three point contact, and uses springs which are aligned along an axis different from the clamping force.

U.S. Pat. No. 5,513,838 to Van Rossum teaches a method using a partially circular ring with multiple threaded clamps, to apply pressure to the perimeter of an object. However the force on the object depends on the force resulting from the torque applied to the threaded clamps.

U.S. Pat. No. 3,661,409 to Brown teaches a circumferential clamping device having chain links with wedges to aid in the drawing together of pipe coupling sections. The device is tightened by turning a threaded shaft and does not include compression springs.

BRIEF SUMMARY OF THE EMBODIMENTS

The present invention presents a method to adjust the operating angle of a vessel for a vibrating calciner the purpose of which is to heat a granular material in a vibrated state.

The angle of the vessel is defined by the dynamic angle of repose of granular materials when vibrated. This angle varies for each granular material. An example would be a granular material with smooth curved surfaces, such as beads, which has a shallow dynamic angle of repose of approximately 25 degrees compared to a granular material which has sharp angular surfaces, such as abrasives, which has a dynamic angle of repose of approximately 35 degrees. The size distribution of the granular material also has an influence of the dynamic angle of repose. The inner edge of the vessel dams should be substantially parallel to the dynamic angle of repose of the granular material. Also the discharge tube for the vessel should be located at the vertex of a first edge portion of the dam and a second edge portion which is raised relative to the first edge portion.

The dynamic angle of repose of a specific granular material can only be determined by testing. However, after a vessel had been designed and fabricated, additional adjustments to the angle of the vessel may still be needed. For example, adjustment may be required if the properties of the granular material change over time or if a different material is to be processed.

Therefore, it is advantageous to have the ability to rotate the vessel about its longitudinal axis so that the angle of the dams will be substantially parallel to the angle of dynamic repose.

Additionally, there is required a means of emptying the vessel of the granular material for maintenance or when changing to another material. The presence of the internal dams essentially traps granular material in compartments formed by two opposing dams. This invention permits the ability to rotate the vessel by at least 160-180 degrees such that the granular material is not confined by the dams and can easily flow down the vessel when vibrated. There is a drain tube that is oriented at that position of the vessel that will allow the granular material to drain from the vessel.

The adjustment of the vessel angle is achieved by loosening and tightening spring loaded clamps which exert opposing forces on a plurality of circular ring segments that surround the vessel. The force required on the clamps to retain the vessel in proper position is equal to 5 times the weight of the vessel and granular material.

The calciner is to be operated at temperatures as high as 2,400° F. For this reason the materials of construction of the clamps and the vessel must withstand these high temperatures and have the required strength. This means that the mechanical elements to activate the clamps must be in regions of lower temperatures of the heated furnace zone. This limits the application of more common clamping mechanisms.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

Figure 1:
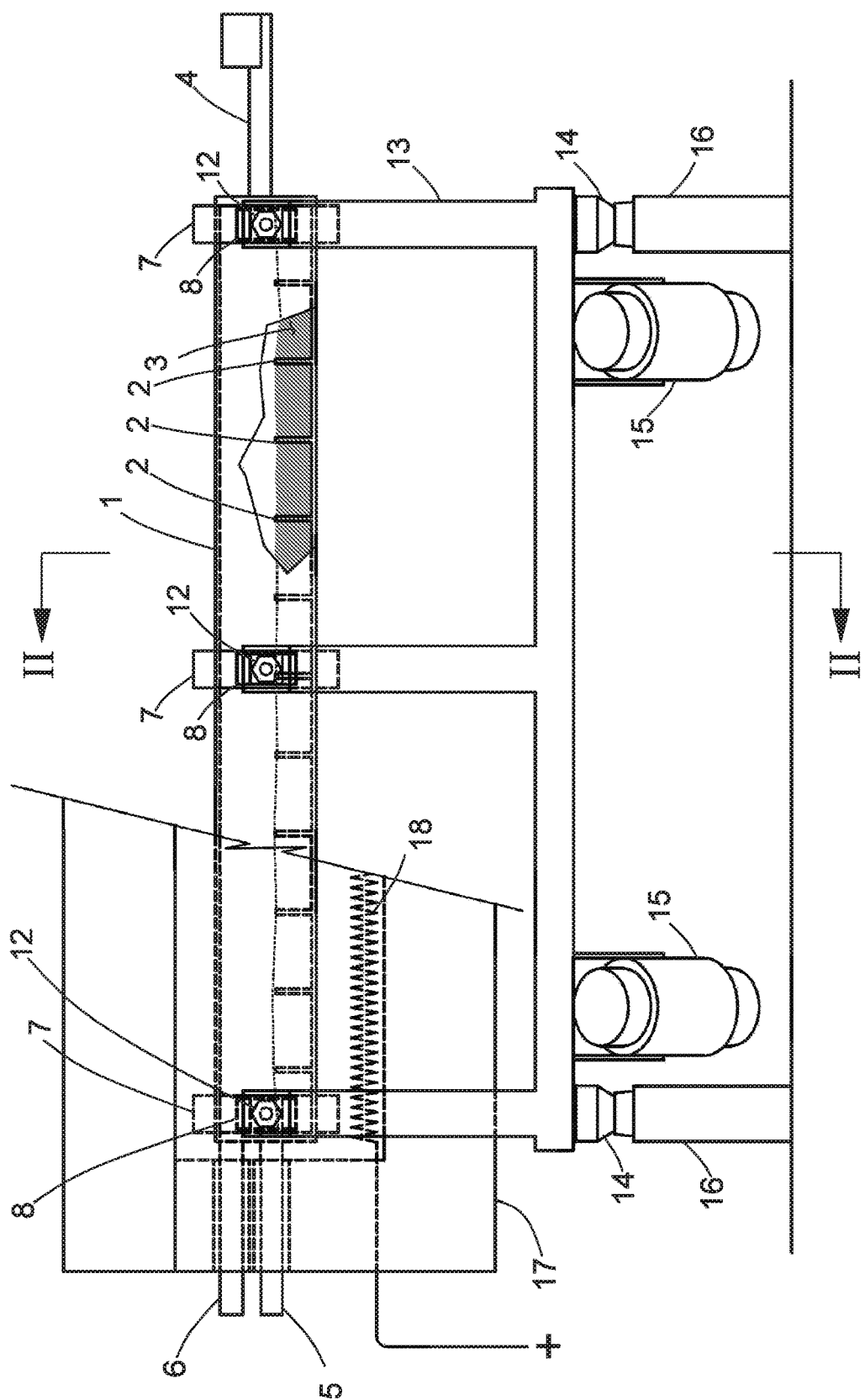
FIG. 1 is a side elevation diagram of a vibrating calciner with a cutaway showing the vessel and the dams.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS

1 Vessel
2 Dam

3 Granular material
4 Feed tube
5 Discharge tube
6 Drain tube
7 Ring segment
8 Clamp
9 Housing
10 Spring
11 Thrust bearing
12 Bolt
13 Vibrating base
14 Vibration isolators
15 Rotary vibrators
16 Base
17 Furnace
18 Heating elements

DETAILED DESCRIPTION OF THE INVENTION

Referring to FIG. 1 shows an elevation view of a vibrating calciner with vessel, 1 and internal dams, 2. The vessel, 1 has an elliptical cross section (see FIG. 2). The vessel, 1 is fed granular material, 3 through a feed tube, 4. The granular material, 3 migrates down the vessel, 1 while flowing over the dams, 2. The granular material, 3 exits the vessel, 1 at the discharge tube, 5. A drain tube, 6 is provided to empty the vessel, 1 of granular material, 3 by a method described below.

The vessel is surrounded by a plurality of ring segments, 7. In one embodiment, the ring segments, 7 are spaced apart along the longitudinal axis by a spacing of at least three times the major diameter of the elliptical vessel, 1.

Figure 3A:
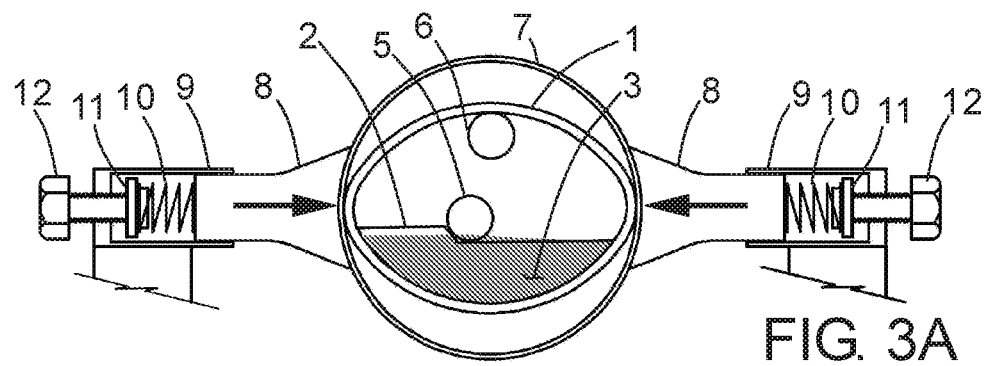
FIGS. 3A-3D are section views of the vessel showing the progressive steps to adjust the angle of the vessel.
Figure 3B:
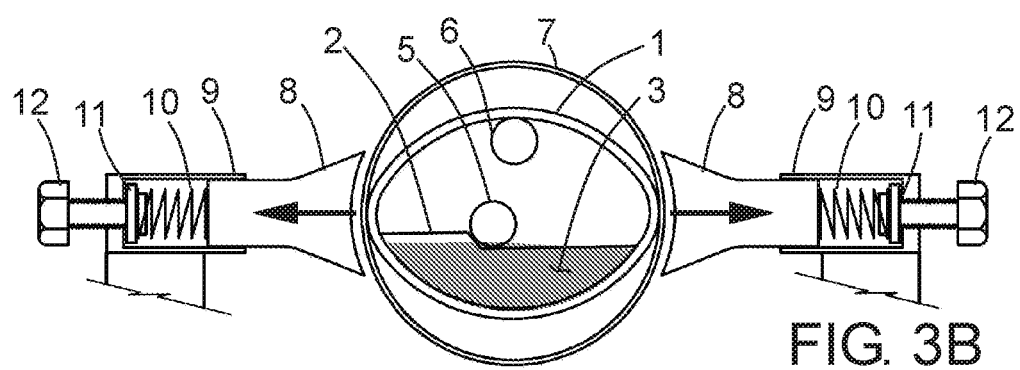

Contacting the outer surface of the ring segments, 7 are clamps, 8 which have concave surfaces shaped to closely contact an outer surface of one of ring segments 7 (see, e.g., FIG. 3B). In an embodiment, the concave surface of each clamp 8 may have a radius of curvature substantially equal to the radius of the ring segments, 7. A pair of clamps, 8 are located 180 degrees apart to achieve opposing forces effecting a retention to hold the ring segments, 7 and thus the vessel, 1.

The clamps, 8 are each located within a housing, 9. The housings, 9 are fixed to vibrating platform, 13 which is supported by vibration isolators, 14. The vibration isolators, 14 are supported by base, 16. Rotary vibrators, 15, which provide the vibrating activation, are fixed to the vibrating platform, 13. The vessel, 1 is enclosed by a furnace, 17 which has heating elements, 18 to provide the heat source.

Figure 2:
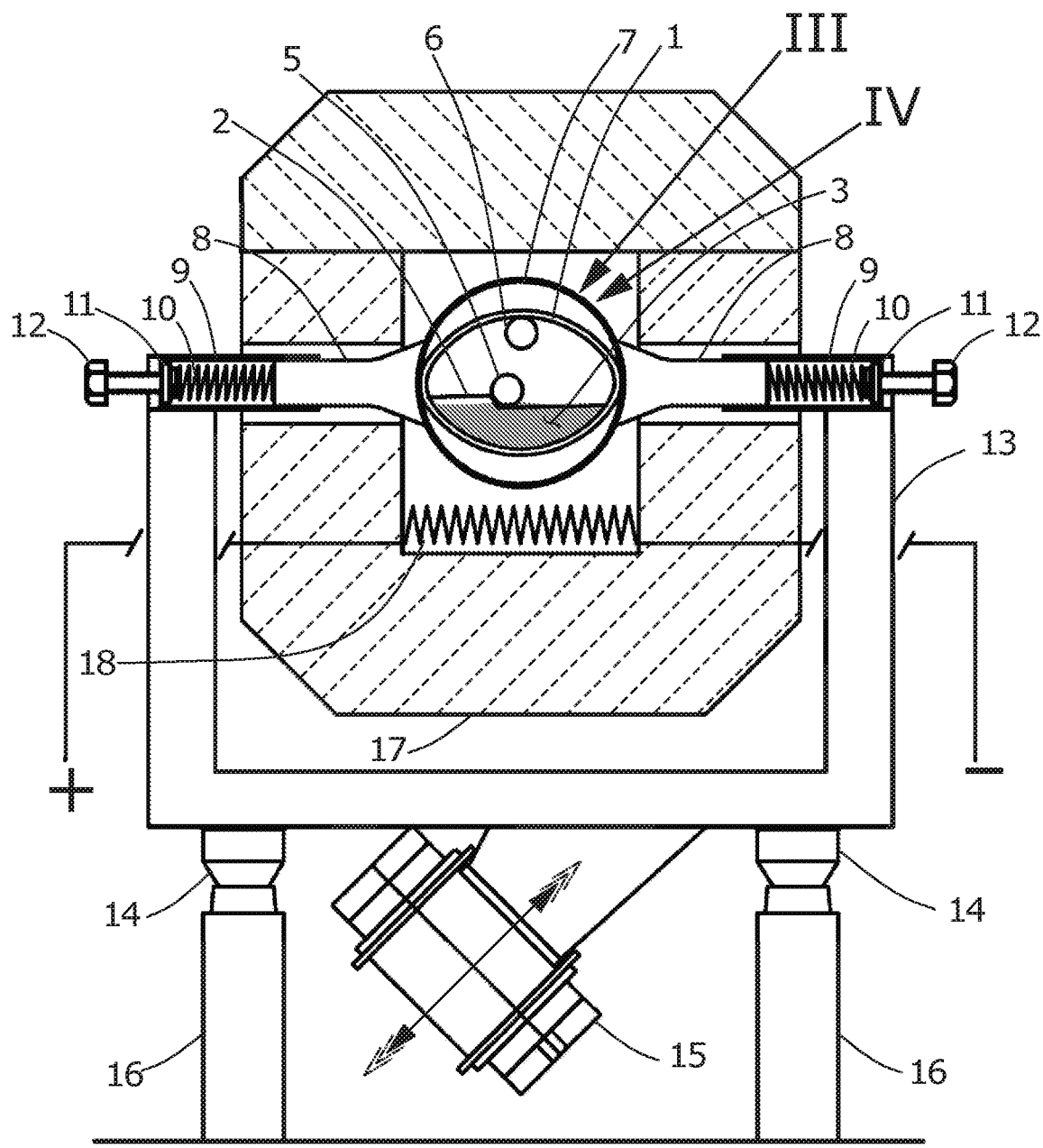
FIG. 2 is a cross section diagram of FIG. 1 showing the essential elements of the vessel clamping and angular adjustment elements.

FIG. 2 is a section view of the vibrating calciner along line II-II of FIG. 1 showing the vessel, 1 dams, 2 granular material, 3 and segmented rings, 7. Contacting the ring segments, 7 are the clamps, 8 located within the housings, 9. Within each of the housings, 9 is a compression spring, 10 contacting the end of the clamp, 8 opposite the concave surface which contacts ring segment 7. A thrust bearing, 11 is inserted into the spring 10 at the end opposite clamp 8. The springs, 10 are compressed by turning a plurality of bolts, 12 inward. Each bolt, 12 is threaded through the end of one of the housings, 9 and provides sufficient force on one of the clamps, 8 to retain the vessel, 1 in the desired position.

Vessel Angle Adjustment for Normal Operation

Referring to FIG. 3A the vessel, 1 is shown held in retention by clamps, 8, as indicated by the directional arrows.

FIG. 3B shows the pressure released on clamps, 8 by turning bolt, 12 and allowing the spring, 10 to expand. The clamps, 8 are moved slightly away from the ring segments, 7.

Figure 3C:
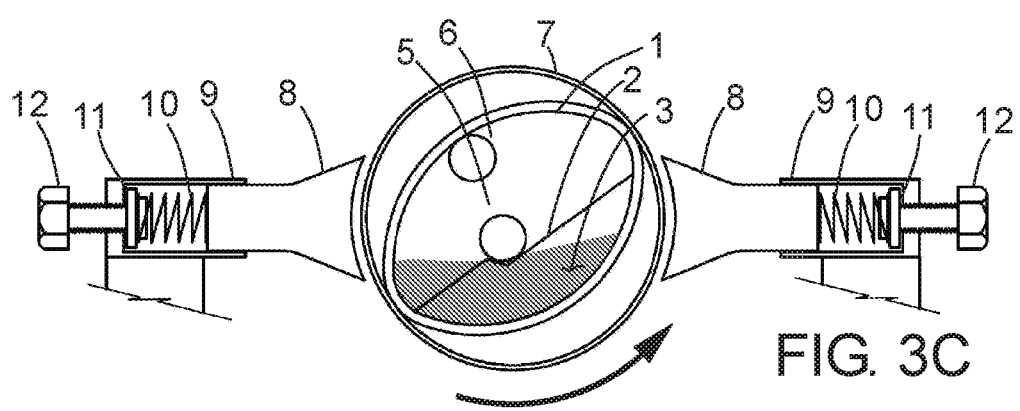

FIG. 3C shows the vessel, 1 rotated to the desired angle by positioning the angle of the inner edge of dam, 2 to be substantially equal to the angle of dynamic repose of the granular material, 3. To facilitate rotating the vessel, a handle, lever, or similar feature may be provided. The ends of the vessel may be supported in a manner which permits rotation, such as on rollers.

Figure 3D:
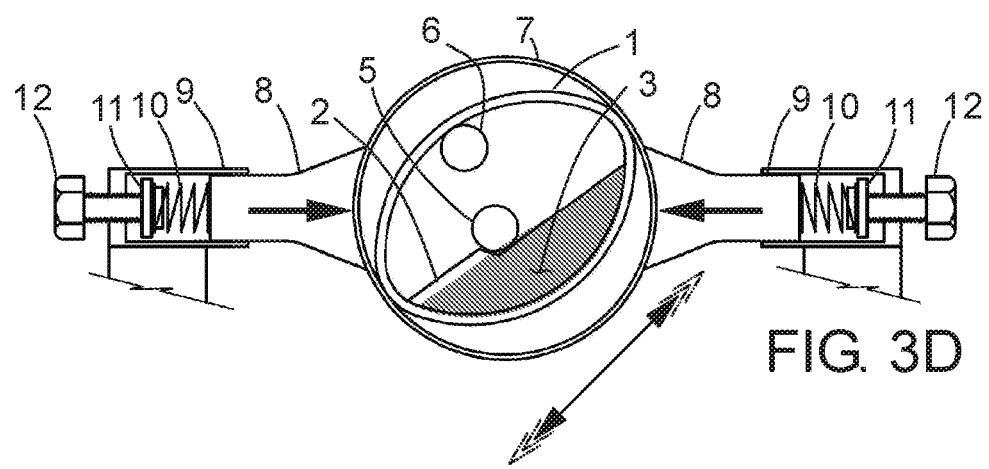

FIG. 3D shows the bolts, 12 being tightened thus compressing springs, 10 and applying a regulated force against the clamps, 8 to transmit the pressure to the ring segments, 7 and holding the vessel, 1 at the desired angle.

Vessel Adjustment to Drain the Vessel of Granular Material

Figure 4A:
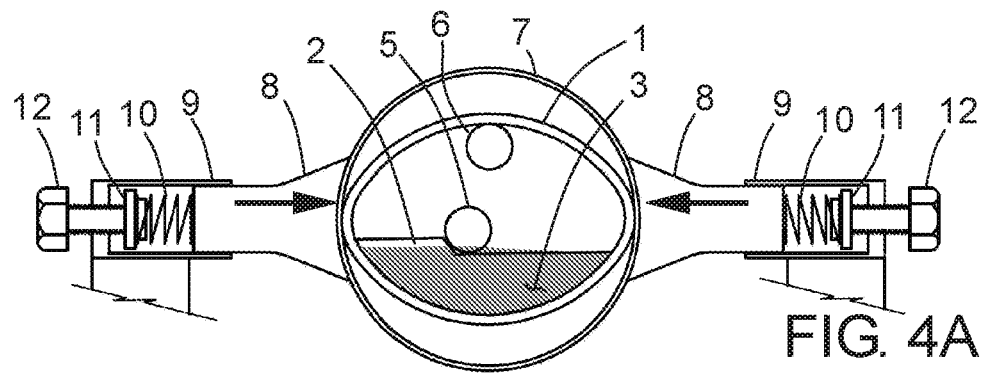
FIGS. 4A-4D are section views of the vessel showing the progressive steps to rotate the angle of the vessel to achieve a position allowing the granular material to drain from the vessel.

Referring to FIG. 4A the vessel, 1 is shown held in retention by clamps, 8.

Figure 4B:
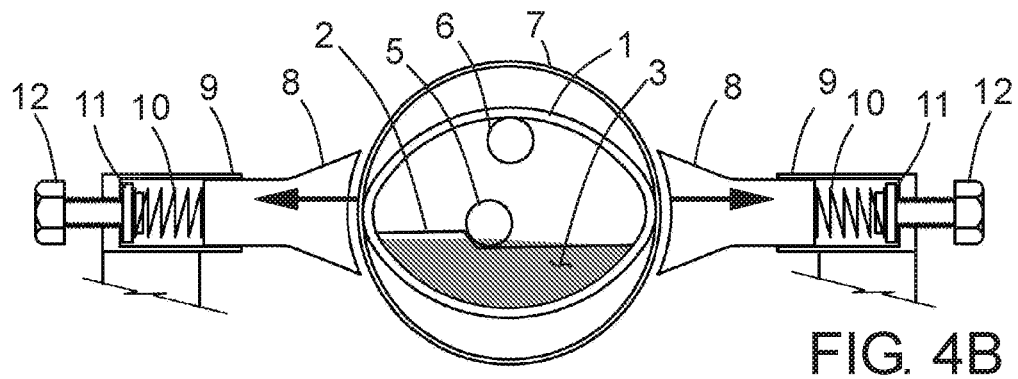

FIG. 4B shows the pressure released on clamps, 8 by turning bolt, 12 and allowing the spring, 10 to expand. The clamps, 8 are moved slightly away from the ring segments, 7.

Figure 4C:
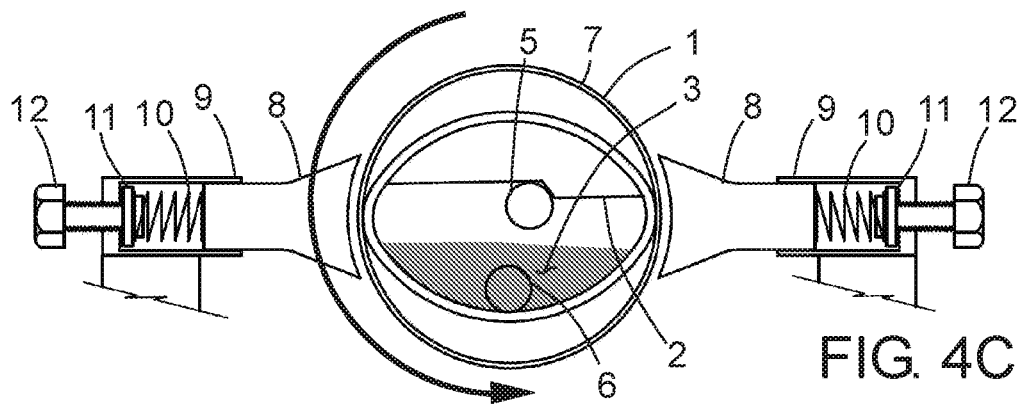

FIG. 4C shows the vessel, 1 rotated between about 160-180 degrees to align the drain tube, 6 to intercept the bed of granular material, 3.

Figure 4D:
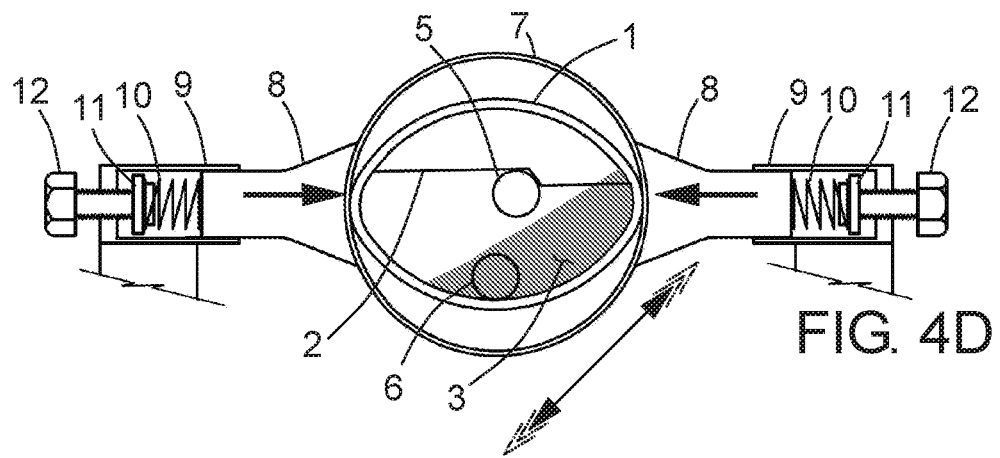

FIG. 4D shows the bolts, 12 being tightened thus compressing springs, 10 and applying a regulated force against the clamps, 8 to transmit the pressure to the ring segments, 7 and holding the vessel, 1 at the desired angle. Since the granular material, 3 is now not confined in the vessel, 1 by the plurality of dams, 2 the granular material, 3 is free to flow to the drain tube, 6 when the vessel, 1 is vibrated to mobilize the granular material, 3 to a vibrated state.

As used in this application, the term "substantially" means that the actual value is within about 10% of the actual desired value of any variable, element, or limit set forth herein.

In terms of use, a method of positioning a vessel of a vibrating calciner for heating a granular material includes: (refer to FIGS. 1-4)
(a) providing a vibrating calciner including:
  (i) a vessel 1;
  (ii) a plurality of circular ring segments 7 each surrounding the vessel and spaced apart along a central longitudinal axis of the vessel;
  (iii) a plurality of clamps 8 connected to a vibrating base 13 and each adjustable to apply pressure to one of the plurality of circular ring segments; and
  (iv) a plurality of vessel dams 2 positioned within the vessel and spaced apart along the central longitudinal axis, each of the vessel dams having an inner edge;
(b) determining a dynamic angle of repose of the granular material;
(c) positioning the vessel within the circular ring segments such that the inner edge of each of the plurality of vessel dams forms an angle with respect to horizontal, the angle substantially equal to the dynamic angle of repose of the granular material; and
(d) after (c), tightening the plurality of clamps to maintain the vessel as positioned in (c).

The method further including:
in (a), the plurality of clamps 8 including pairs of clamps, each of the pair of clamps configured to apply pressure to one of the plurality of circular ring segments 7; and
in (d), tightening the pairs of clamps such that a first clamp of each pair of clamps applies pressure substantially equal to and in the opposite direction of pressure applied by a second clamp of the pair of clamps.

The method further including:

in (a), the vibrating calciner having a drain tube 6 located at an end of the vessel 1 and arranged about the central longitudinal axis opposite the plurality of vessel dams 2;

feeding the granular material into the vessel;

after (d), heating the granular material;

then, releasing the plurality of clamps 8, positioning the vessel within the circular ring segments 7 such that the vessel dams are positioned above the granular material, tightening the plurality of clamps, and vibrating the vessel to drain the granular material through the drain tube.

The embodiments of the device/apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device/apparatus and method should be construed as limiting the invention to a particular embodiment or combination of embodiments. The scope of the invention is defined by the appended claims.

I claim:

1. A vibrating calciner including:

a vessel;

a plurality of circular ring segments each surrounding the vessel and spaced apart along a central longitudinal axis of the vessel;

a plurality of clamps connected to a vibrating base, each of the plurality of clamps adjustable to apply pressure to one of the plurality of circular ring segments;

a plurality of vessel dams positioned within the vessel and spaced apart along the central longitudinal axis, each of the plurality of vessel dams having an inner edge;

a furnace surrounding the vessel, the plurality of circular ring segments, and the plurality of clamps; and wherein the vessel is rotatably positionable about the central longitudinal axis within the circular ring segments such that the inner edge of each of the plurality of vessel dams is positionable over a range of angles between 20 degrees and 45 degrees with respect to horizontal.

2. The vibrating calciner of claim 1, further including:

a drain tube located at an end of the vessel and arranged about the central longitudinal axis opposite the plurality of vessel dams; and wherein the vessel is rotatably positionable about the central longitudinal axis within the circular ring segments to a position wherein the plurality of vessel dams are in an upper portion of the vessel and the drain tube is in a lower portion of the vessel and positioned lower than the inner edge of each of the plurality of vessel dams.

3. The vibrating calciner of claim 1, wherein:

the vessel is continuously rotatably positionable about the central longitudinal axis within the circular ring segments.

4. The vibrating calciner of claim 1, wherein:

the vessel has an elliptical cross section orthogonal to the central longitudinal axis.

5. The vibrating calciner of claim 1, wherein:

the vessel has a cross section orthogonal to the central longitudinal axis, and the cross section has a major diameter; and the plurality of circular ring segments are spaced apart by a spacing of at least three times the major diameter of the vessel.

6. The vibrating calciner of claim 1, wherein:

the plurality of clamps comprises multiple pairs of clamps, a first clamp of each pair of clamps configured to apply pressure in a first direction to one of the plurality of circular ring segments and a second clamp of each pair of clamps configured to apply pressure to the same one of the plurality of circular ring segments in a second direction opposite the first direction.

7. The vibrating calciner of claim 6, wherein:

each of the plurality of clamps has a concave surface that contacts an outer surface of one of the plurality of circular ring segments.

8. The vibrating calciner of claim 1, wherein:

the inner edge of each of the plurality of vessel dams has a first edge portion and a second edge portion adjoining the first edge portion at a vertex;

the vertices of each of the plurality of vessel dams are aligned along the central longitudinal axis of the vessel; and a discharge tube is mounted on the vessel, rotatable therewith, and aligned with the vertices of each of the plurality of vessel dams.

9. The vibrating calciner of claim 1, wherein:

a spring in connection with each of the plurality of clamps is adjustably compressible to apply pressure to one of the plurality of circular ring segments.

* * * * *